United States Patent
Das et al.

(10) Patent No.: US 9,277,368 B2
(45) Date of Patent: Mar. 1, 2016

(54) METHOD AND APPARATUS FOR DETERMINING WHETHER OR NOT A MOBILE DEVICE IS INDOORS

(71) Applicant: QUALCOMM Incorporated, San Diego, CA (US)

(72) Inventors: Saumitra Mohan Das, Santa Clara, CA (US); Ravi Palanki, Cupertino, CA (US); Yin Chen, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 13/945,705

(22) Filed: Jul. 18, 2013

(65) Prior Publication Data

US 2015/0024772 A1    Jan. 22, 2015

(51) Int. Cl.
*H04W 4/04* (2009.01)
*G01S 5/02* (2010.01)
*G01S 19/48* (2010.01)
*G01S 19/50* (2010.01)

(52) U.S. Cl.
CPC .............. *H04W 4/043* (2013.01); *G01S 5/0236* (2013.01); *G01S 5/0263* (2013.01); *G01S 5/0284* (2013.01); *G01S 19/48* (2013.01); *G01S 19/50* (2013.01)

(58) Field of Classification Search
CPC ......... H04W 4/00; H04W 24/00; H04W 4/02; H04W 4/22; H04W 4/021; H04W 4/06; H04W 64/00; H04W 12/06; H04W 4/027; H04W 60/005; H04W 60/02; H04W 68/00; H04W 68/005; H04W 16/18; H04W 16/22; H04W 24/08; H04M 11/04; G01C 21/00
USPC ............ 455/427, 456.1, 404.2, 456.6, 404.1, 455/412.1, 41.2, 426.1, 431, 456.2, 456.3, 455/457, 567; 701/408, 409, 412, 468, 469
See application file for complete search history.

(56) References Cited

U.S. PATENT DOCUMENTS

| | | | |
|---|---|---|---|
| 7,831,486 B2 | 11/2010 | Main, II et al. | |
| 8,350,758 B1 | 1/2013 | Parvizi et al. | |
| 2010/0291949 A1* | 11/2010 | Shapira et al. | 455/456.1 |
| 2011/0172906 A1 | 7/2011 | Das et al. | |
| 2011/0182238 A1 | 7/2011 | Marshall et al. | |
| 2012/0150434 A1 | 6/2012 | Cho et al. | |
| 2012/0309376 A1* | 12/2012 | Huang et al. | 455/418 |
| 2013/0052983 A1 | 2/2013 | Fletcher et al. | |
| 2013/0072226 A1 | 3/2013 | Thramann | |
| 2013/0218931 A1* | 8/2013 | Lewis | 707/803 |
| 2013/0332064 A1* | 12/2013 | Funk et al. | 701/409 |
| 2014/0074873 A1* | 3/2014 | Ngo et al. | 707/758 |
| 2014/0136286 A1* | 5/2014 | Hovis | A01B 69/00 705/7.34 |
| 2014/0278054 A1* | 9/2014 | Tidd et al. | 701/409 |

FOREIGN PATENT DOCUMENTS

| | | |
|---|---|---|
| WO | 0148505 A2 | 7/2001 |
| WO | 2010012303 A2 | 2/2010 |

OTHER PUBLICATIONS

International Search Report and Written Opinion—PCT/US2014/046625—ISA/EPO—Oct. 6, 2014.

* cited by examiner

*Primary Examiner* — Inder Mehra
(74) *Attorney, Agent, or Firm* — Muncy, Geissler, Olds & Lowe, P.C.

(57) ABSTRACT

The disclosure is directed to determining whether or not a mobile device is indoors. The mobile device obtains a position fix based, at least in part, on an outdoor positioning system, and obtains one or more shape-files for one or more objects that are in proximity of the position fix.

36 Claims, 8 Drawing Sheets

METHOD AND APPARATUS FOR DETERMINING WHETHER OR NOT A MOBILE DEVICE IS INDOORS

FIELD OF DISCLOSURE

The disclosure is related to a method and apparatus for determining whether or not a mobile device is indoors.

BACKGROUND

Mobile communications networks are in the process of offering increasingly sophisticated capabilities associated with the motion and/or position location sensing of a user equipment (UE). New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a UE when the UE places a call to an emergency service, such as a 911 call in the United States.

Such motion and/or position determination capabilities have conventionally been provided using digital cellular positioning techniques and/or Satellite Positioning Systems (SPS). Additionally, with the increasing proliferation of miniaturized motion sensors (e.g., simple switches, accelerometers, angle sensors, etc.), such on-board devices may be used to provide relative position, velocity, acceleration and/or orientation information.

In conventional digital cellular networks, position location capability can be provided by various time and/or phase measurement techniques. For example, in Code Division Multiple Access (CDMA) networks, one position determination approach used is Advanced Forward Link Trilateration (AFLT). Using AFLT, a UE may compute its position from phase measurements of pilot signals transmitted from a plurality of base stations. Improvements to AFLT have been realized by utilizing hybrid position location techniques, where the UE may employ an SPS receiver that can provide position information independent of the information derived from the signals transmitted by the base stations. Moreover, position accuracy can be improved by combining measurements derived from both SPS and AFLT systems using conventional techniques.

Furthermore, navigation devices often support popular and increasingly important SPS wireless technologies which may include, for example, the Global Positioning System (GPS) and/or a Global Navigation Satellite System (GNSS). Navigation devices supporting SPS may obtain navigation signals as wireless transmissions received from one or more transmitter equipped satellites that may be used to estimate geographic position and heading. Some navigation devices may additionally or alternatively obtain navigation signals as wireless transmissions received from terrestrial based transmitters to estimate geographic position and heading and/or include one or more inertial sensors (e.g., accelerometers, gyroscopes, etc.) that reside on-board the navigation device to measure an inertial state of the navigation device. Inertial measurements obtained from these inertial sensors may be used in combination with or independent of navigation signals received from satellite and/or terrestrial based transmitters to provide estimates of geographic position and heading.

SUMMARY

The various aspects of the disclosure are directed to determining whether or not a mobile device is indoors. A method for determining whether or not a mobile device is indoors includes obtaining, by the mobile device, a position fix based, at least in part, on an outdoor positioning system, and obtaining, by the mobile device, one or more shape-files for one or more objects that are in proximity of the position fix.

An apparatus for determining whether or not a mobile device is indoors includes logic configured to obtain, by the mobile device, a position fix based, at least in part, on an outdoor positioning system, and logic configured to obtain, by the mobile device, one or more shape-files for one or more objects that are in proximity of the position fix.

An apparatus for determining whether or not a mobile device is indoors includes means for obtaining, by the mobile device, a position fix based, at least in part, on an outdoor positioning system, and means for obtaining, by the mobile device, one or more shape-files for one or more objects that are in proximity of the position fix.

A non-transitory computer-readable medium for determining whether or not a mobile device is indoors includes at least one instruction to obtain, by the mobile device, a position fix based, at least in part, on an outdoor positioning system, and at least one instruction to obtain, by the mobile device, one or more shape-files for one or more objects that are in proximity of the position fix.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration."

Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof.

The terminology used herein is for the purpose of describing particular embodiments only and is not intended to be limiting of embodiments of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
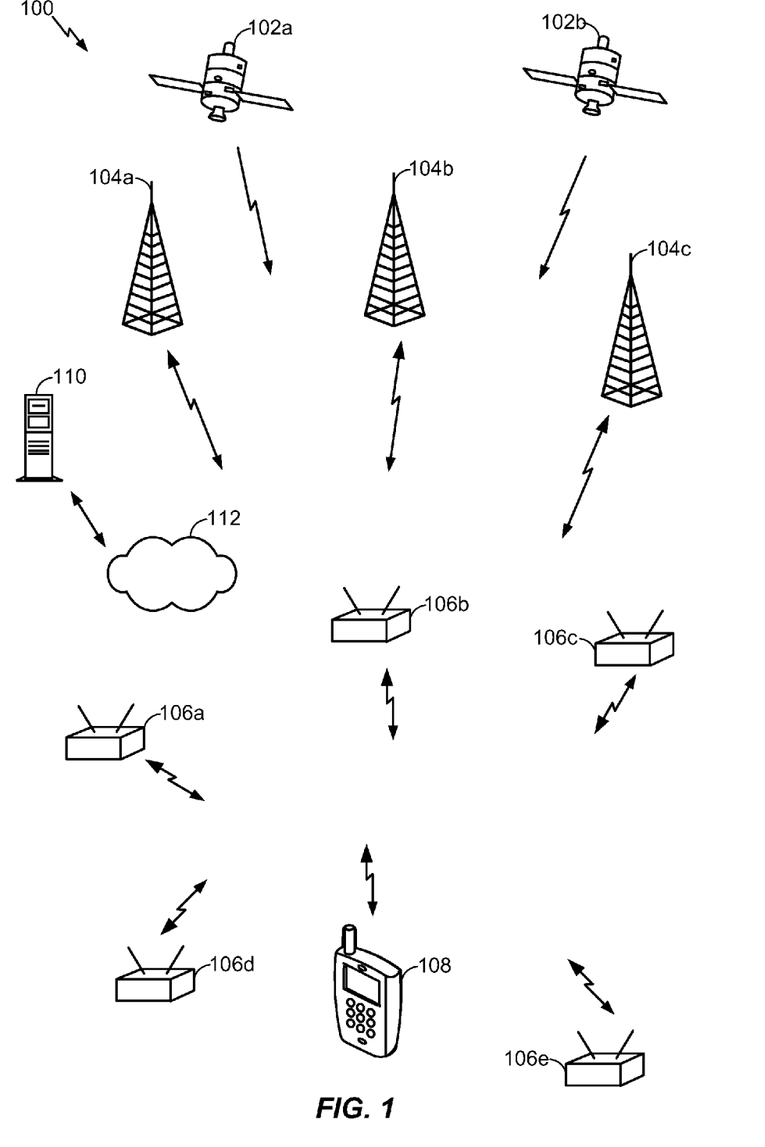
FIG. 1 illustrates an exemplary operating environment for a user equipment (UE) that can determine position using wireless techniques, according to one aspect of the disclosure.

According to one aspect of the disclosure, FIG. 1 illustrates an exemplary operating environment 100 for a UE 108 having wireless positioning capability. Embodiments are directed to a UE 108 which may determine its position based upon round trip time (RTT) measurements that are adjusted to accommodate for processing delays introduced by wireless access points. The processing delays may vary among different access points and may also change over time. By using information from a motion sensor, the UE 108 may calibrate out the effects of the processing delays introduced by the wireless access points.

The operating environment 100 may contain one or more different types of wireless communication systems and/or wireless positioning systems. In the embodiment shown in FIG. 1, a Satellite Positioning System (SPS) 102 may be used as an independent source of position information for the UE 108. The UE 108 may include one or more dedicated SPS receivers specifically designed to receive signals for deriving geo-location information from the SPS satellites.

The operating environment 100 may also include one or more Wide Area Network Wireless Access Points (WAN-WAPs) 104a-104c, which may be used for wireless voice and/or data communication, and as another source of independent position information for the UE 108. The WAN-WAPs 104a-104c may be part of a wide area wireless network (WWAN), which may include cellular base stations at known locations, and/or other wide area wireless systems, such as, for example, WiMAX (e.g., 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106a-106e, which may be used for wireless voice and/or data communication, as well as another independent source of position data. The LAN-WAPs 106a-106e can be part of a Wireless Local Area Network (WLAN), which may operate in buildings and perform communications over smaller geographic regions than a WWAN. Such LAN-WAPs 106a-106e may be part of, for example, Wi-Fi networks (802.11x), cellular piconets and/or femtocells, Bluetooth Networks, or any other short-range or medium-range wireless network.

The UE 108 may derive position information from any one or more of the SPS satellites 102a and 102b, the WAN-WAPs 104a-104c, and/or the LAN-WAPs 106a-106e. Each of the aforementioned systems can provide an independent estimate of the position for the UE 108 using different techniques. In some embodiments, the UE 108 may combine the solutions derived from each of the different types of access points to improve the accuracy of the position data. When deriving position using the SPS 102, the UE 108 may utilize a receiver specifically designed for use with the SPS that extracts position, using conventional techniques, from a plurality of signals transmitted by SPS satellites 102a and 102b.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite," as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the UE 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAPs 104 may actually be moveable or otherwise capable of being relocated, for illustration purposes it will be assumed that they are essentially arranged in a fixed position.

The UE 108 may perform position determination using known time-of-arrival (TOA) techniques such as, for example, Advanced Forward Link Trilateration (AFLT). In other embodiments, each WAN-WAP 104a-104c may comprise a Worldwide Interoperability for Microwave Access (WiMAX) wireless networking base station. In this case, the UE 108 may determine its position using TOA techniques from signals provided by the WAN-WAPs 104a-104c. The UE 108 may determine positions either in a stand-alone mode, or using the assistance of a positioning server 110 and network 112 using TOA techniques, as will be described in more detail below. Furthermore, various embodiments may have the UE 108 determine position information using WAN-WAPs 104a-104c, which may have different types. For example, some WAN-WAPs 104a-104c may be cellular base stations, and other WAN-WAPs 104a-104c may be WiMAX base stations. In such an operating environment, the UE 108 may be able to exploit the signals from each different type of WAN-WAP 104, and further combine the derived position solutions to improve accuracy.

When deriving position using the WLAN, the UE 108 may utilize time of arrival techniques with the assistance of the positioning server 110 and the network 112. The positioning server 110 may communicate to the UE 108 through network 112. Network 112 may include a combination of wired and wireless networks which incorporate the LAN-WAPs 106a-106e. In one embodiment, each LAN-WAP 106a-106e may be, for example, a Wi-Fi wireless access point, which is not necessarily set in a fixed position and can change location.

The position of each LAN-WAP 106a-106e may be stored in the positioning server 110 in a common coordinate system. In one embodiment, the position of the UE 108 may be determined by having the UE 108 receive signals from each LAN-WAP 106a-106e. Each signal may be associated with its originating LAN-WAP based upon some form of identifying information that may be included in the received signal (such as, for example, a MAC address). The UE 108 may then sort the received signals based upon signal strength, and derive the time delays associated with each of the sorted received signals. The UE 108 may then form a message which can include the time delays and the identifying information of each of the LAN-WAPs, and send the message via network 112 to the positioning server 110. Based upon the received message, the positioning server may then determine a position, using the stored locations of the relevant LAN-WAPs 106, of the UE 108. The positioning server 110 may generate and provide a Location Configuration Indication (LCI) message to the UE 108 that includes a pointer to the position of the UE 108 in a local coordinate system. The LCI message may also include other points of interest in relation to the location of the UE 108. When computing the position of the UE 108, the positioning server may take into account the different delays which can be introduced by elements within the wireless network.

The position determination techniques described herein may be used for various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Figure 2:
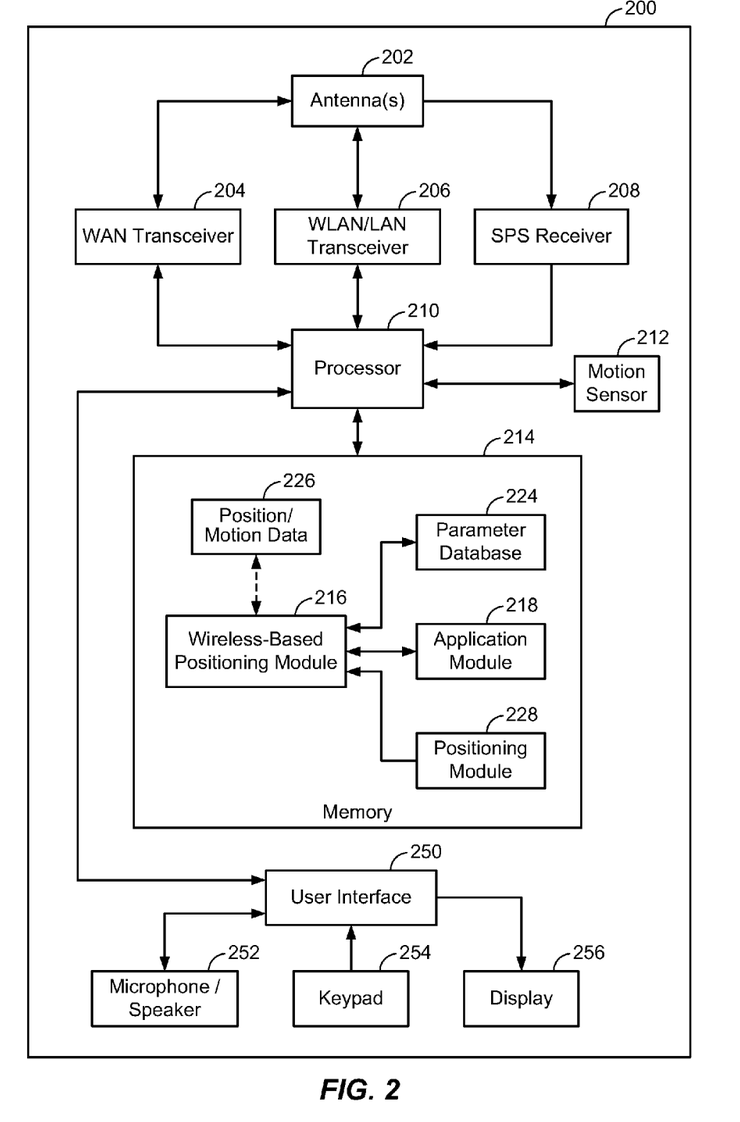
FIG. 2 illustrates an exemplary UE that may be used in an operating environment that can determine position using wireless techniques, according to one aspect of the disclosure.

FIG. 2 is a block diagram illustrating various components of an exemplary UE 200. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The UE 200 may include one or more wide area network (WAN) transceiver(s) 204 that may be connected to one or more antennas 202. The WAN transceiver 204 comprises suitable devices, hardware, and/or software for communicating with and/or detecting signals to/from WAN-WAPs 104a-104c, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (802.16), etc. The UE 200 may also include one or more wireless local area network (WLAN)/local area network (LAN) transceivers 206 that may be connected to one or more antennas 202. The WLAN/LAN transceiver 206 comprises suitable devices, hardware, and/or software for communicating with and/or detecting signals to/from LAN-WAPs 106a-106e, and/or directly with other wireless devices within a network. In one aspect, the WLAN/LAN transceiver 206 may comprise a Wi-Fi (802.11x) communication system suitable for communicating with one or more wireless access points; however in other aspects, the WLAN/LAN transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106a-106e and/or WAN-WAPs 104a-104c. Specifically, in the description presented below, when the term "WAP" is used, it should be understood that embodiments may include a UE 200 that can exploit signals from a plurality of LAN-WAPs 106a-106e, a plurality of WAN-WAPs 104a-104c, or any combination of the two. The specific type of WAP being utilized by the UE 200 may depend upon the environment of operation. Moreover, the UE 200 may dynamically select between the various types of WAPs in order to arrive at an accurate position solution. In other embodiments, various network elements may operate in a peer-to-peer manner, whereby, for example, the UE 200 may be replaced with the WAP, or vice versa. Other peer-to-peer embodiments may include another UE (not shown) acting in place of one or more WAP.

An SPS receiver 208 may also be included in the UE 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the UE 200's position using measurements obtained by any suitable SPS algorithm.

A motion sensor 212 may be coupled to a processor 210 to provide movement and/or orientation information which is independent of motion data derived from signals received by the WAN transceiver 204, the WLAN/LAN transceiver 206 and the SPS receiver 208.

By way of example, the motion sensor 212 may utilize an accelerometer (e.g., a microelectromechanical systems (MEMS device)), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, WLAN/LAN transceiver 206, the SPS receiver 208 and the motion sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the UE 200. The memory 214 may be on-board the processor 210 (e.g., within the same IC package), and/or the memory may be external memory to the processor and functionally coupled over a data bus. The functional details associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a wireless-based positioning module 216, an application module 218, and a positioning module 228. One should appreciate that the organization of the memory contents as shown in FIG. 2 is merely exemplary, and as such the functionality of the modules and/or data structures may be combined, separated, and/or be structured in different ways depending upon the implementation of the UE 200.

The application module 218 may be a process running on the processor 210 of the UE 200, which requests position information from the wireless-based positioning module 216. Applications typically run within an upper layer of the software architectures, and may include Indoor Navigation, Buddy Locator, Shopping and Coupons, Asset Tracking, and location Aware Service Discovery. The wireless-based positioning module 216 may derive the position of the UE 200 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the motion sensor 212. In one embodiment, the motion sensor 212 may directly provide position and/or orientation data to the processor 210, which may be stored in memory 214 in the position/motion data module 226. In other embodiments, the motion sensor 212 may provided data which should be further processed by processor 210 to derive information to perform the calibration. For example, the motion sensor 212 may provide acceleration and/or orientation data (single or multi-axis) which can be processed using positioning module 228 to derive position data for adjusting the processing delays in the wireless-based positioning module 216.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, the WAPs positions in a common coordinate frame, various parameters associated with the network, initial processing delay estimates, etc.

In other embodiments, the additional information may optionally include auxiliary position and/or motion data which may be determined from other sources besides the motion sensor 212, such as, for example, from SPS measurements. The auxiliary position data may be intermittent and/or noisy, but may be useful as another source of independent information for estimating the processing delays of the WAPs depending upon the environment in which the UE 200 is operating.

For example, in some embodiments, data derived from the SPS receiver 208 may supplement the position data supplied by the motion sensor 212 (either directly from the position/motion data module 226 or derived by the positioning module 228). In other embodiments, the position data may be combined with data determined through additional networks using non-RTT techniques (e.g., AFLT within a CDMA network). In certain implementations, the motion sensor 212 and/or the SPS receiver 208 may provide all or part of the auxiliary position/motion data 226 without further processing by the processor 210. In some embodiments, the auxiliary position/motion data 226 may be directly provided by the motion sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the application module 218 may be provided in firmware. Additionally, while in this example the wireless-based positioning module 216 and the application module 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines that exploit motion data for use in other portions of the UE 200.

The UE 200 may include a user interface 250 which provides any suitable interface systems, such as a microphone/speaker 252, keypad 254, and display 256 that allows user interaction with the UE 200. The microphone/speaker 252 provides for voice communication services using the WAN transceiver 204 and/or the WLAN/LAN transceiver 206. The keypad 254 comprises any suitable buttons for user input. The display 256 comprises any suitable display, such as, for example, a backlit LCD display, and may further include a touch screen display for additional user input modes.

As used herein, the UE 108 and/or UE 200 may be any portable or movable device or machine that is configurable to acquire wireless signals transmitted from, and transmit wireless signals to, one or more wireless communication devices or networks. As shown in FIG. 1 and FIG. 2, the UE 108 and/or UE 200 are representative of such a portable wireless device. Thus, by way of example but not limitation, the UE 108 may include a radio device, a cellular telephone device, a computing device, a personal communication system (PCS) device, or other like movable wireless communication equipped device, appliance, or machine. The term "user equipment" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "user equipment" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "user equipment."

As used herein, the terms "wireless device," "mobile station," "mobile device," "user equipment," etc. may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable device capable of receiving and processing network and/or SPS signals.

Figure 3:
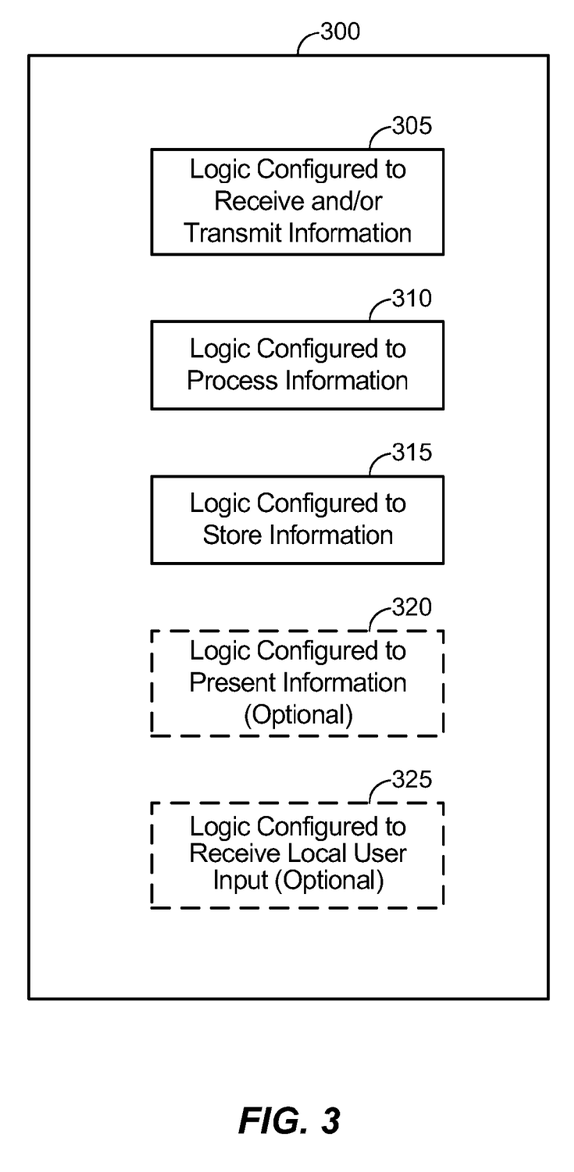
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UE 108, UE 200, SPS satellites 102a-102b, WAN-WAPs 104a-104c, LAN-WAPs 106a-106e, positioning server 110, any component of the network 112, and so on. Thus, communication device 300 can correspond to any electronic device that is configured to communicate with (or facilitate communication with) one or more other entities over the operating environment 100 of FIG. 1.

Referring to FIG. 3, the communication device 300 includes logic configured to receive and/or transmit information 305. In an example, if the communication device 300 corresponds to a wireless communications device (e.g., UE 108, UE 200), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). As an example, the logic configured to receive and/or transmit information 305 can include logic configured to obtain, by a mobile device, a position fix based, at least in part, on an outdoor positioning system and logic configured to obtain, by the mobile device, one or more shape-files for one or more objects that are in proximity of the position fix. In another example, the logic configured to receive and/or transmit information 305 can correspond to a wired communications interface (e.g., a serial connection, a USB or Firewire connection, an Ethernet connection through which the Internet can be accessed, etc.). Thus, if the communication device 300 corresponds to some type of network-based server (e.g., the positioning server 110), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. As an example, the logic configured to process information 310 can include logic configured to obtain, by a mobile device, a position fix based, at least in part, on an outdoor positioning system and logic configured to obtain, by the mobile device, one or more shape-files for one or more objects that are in proximity of the position fix. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200 as shown in FIG. 2, the logic configured to present information 320 can include the speaker 252 and the display 256 of UE 200. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200 as shown in FIG. 2, the logic configured to receive local user input 325 can include the microphone 252, the keypad 254, the display 256, etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

It is beneficial for a UE to be able to detect whether or not it is inside or near an indoor positioning-enabled indoor venue. It is important to trigger the indoor positioning system correctly because indoor positioning systems have associated costs for download (e.g., assistance data for positioning and location context identifier disambiguation (LCI-D)) and algorithm computation. Performing this "in" detection correctly allows the UE to turn off its GNSS receiver when indoors to save power.

Figure 4:
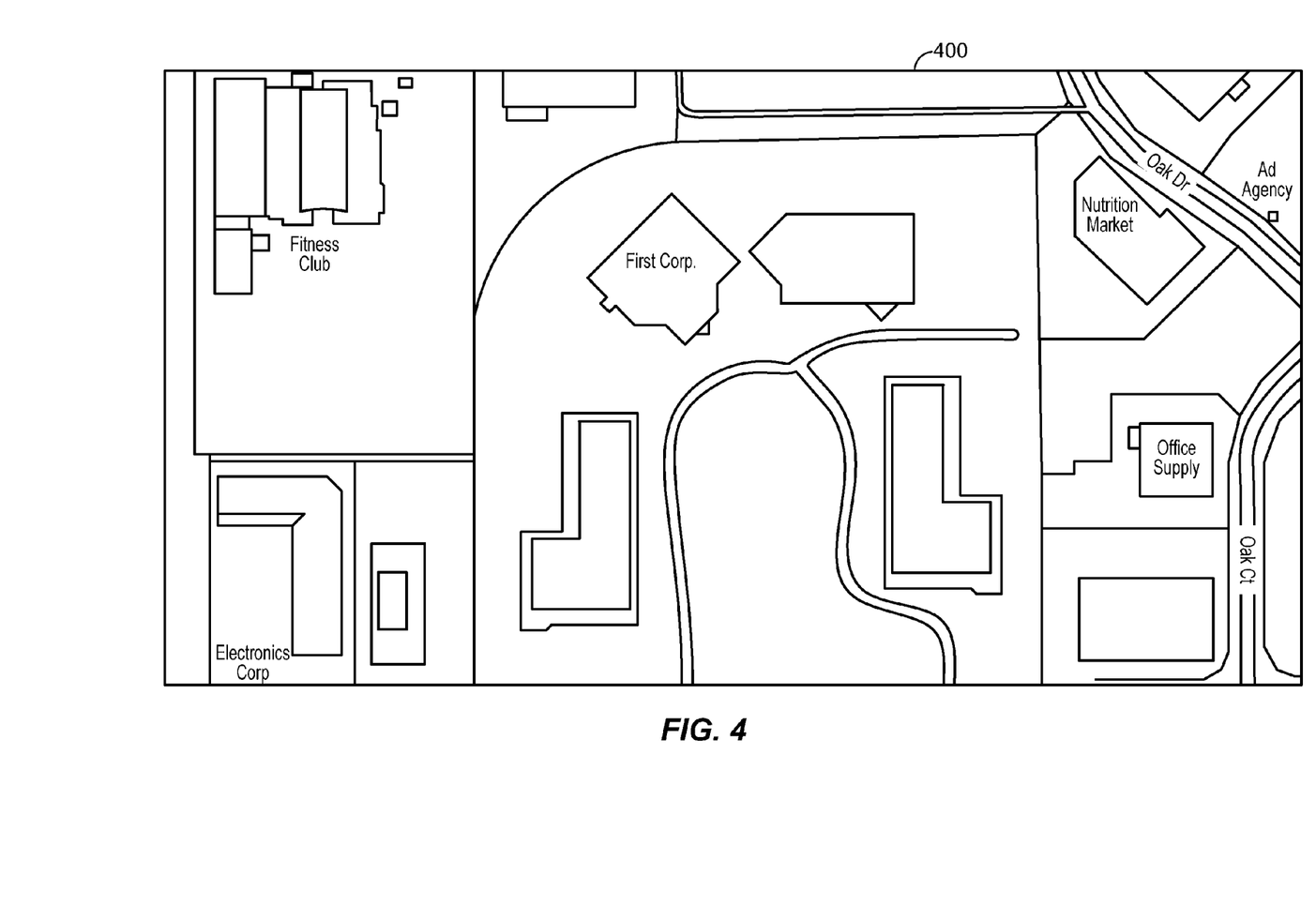
FIG. 4 illustrates an exemplary street map showing various building outlines and their associated labels.

This disclosure describes a map-assisted method to perform this "in" detection. It is now possible to do computer vision-based analysis of aerial or other imagery to detect building outlines. Several map providers, such as Google™ and Bing™, already do this to make their maps look more appealing and more complete. Other vendors, such as NAVTEQ™, have products that provide these building outlines to other vendors that have products that need map integration. FIG. 4 illustrates an exemplary street map 400 showing various building outlines and their associated labels. Aspects of the disclosure use these building boundaries as input to a map-assisted method for determining whether or not a UE is inside a particular building.

Based on an outdoor positioning system position fix, such as a WWAN or GNSS-based position fix, a UE can download one or more shape files of major building outlines (such as the buildings shown on map 400 illustrated in FIG. 4) near the UE's current position fix. The downloaded outlines can be biased by the popularity of UEs that are deemed to be "in" the structures. This popularity metric can be obtained via crowdsourcing. For example, if a lot of users spend time within a particular building outline, such as a mall, this information can be gathered over time via crowdsourcing. If a new user is in the vicinity of that particular building, then this crowdsourced information can be used to determine that the user is more likely to be in the building.

The provided outlines can also be biased based on structures in which the specific UE spends a lot of time and/or visits frequently. This metric can be obtained by selfsourcing indoor positioning system fixes. For example, if a user frequently visits a particular building, this information can be gathered over time via selfsourcing. Then, if the user is again in the vicinity of that particular building, this selfsourced information can be used to determine that the user is more likely to be in the building.

If an obtained outdoor positioning system position fix is determined to be inside one of the buildings in the downloaded shape file(s), the UE is assigned a high probability of being indoors. An ellipse indicating the uncertainty of the UE's position (i.e. "uncertainty ellipse") can overlap with buildings or other structures in the shape file(s) and can also be taken into account to estimate whether or not the UE is indoors. The uncertainty ellipse is usually determined by the position estimation system, such as GPS. A positioning receiver outputs a position estimate plus an ellipse around the position estimate that corresponds to how much confidence the receiver has in the estimate. The size of the uncertainty ellipse is calculated to represent the confidence of the position fix. For example, the radius of such an ellipse can be equal to the estimated standard deviation of the position fix.

If the UE determines that it is inside one of the buildings in the shape file(s), it can send a request for assistance data for either location context identifier disambiguation (LCI-D) (e.g., for multi-floor venues) or positioning services (e.g., for single floor venues). LCI-D provides information identifying an area or location within a building, such as a particular floor of a multi-floor building, a particular room, and the like.

Figure 5:
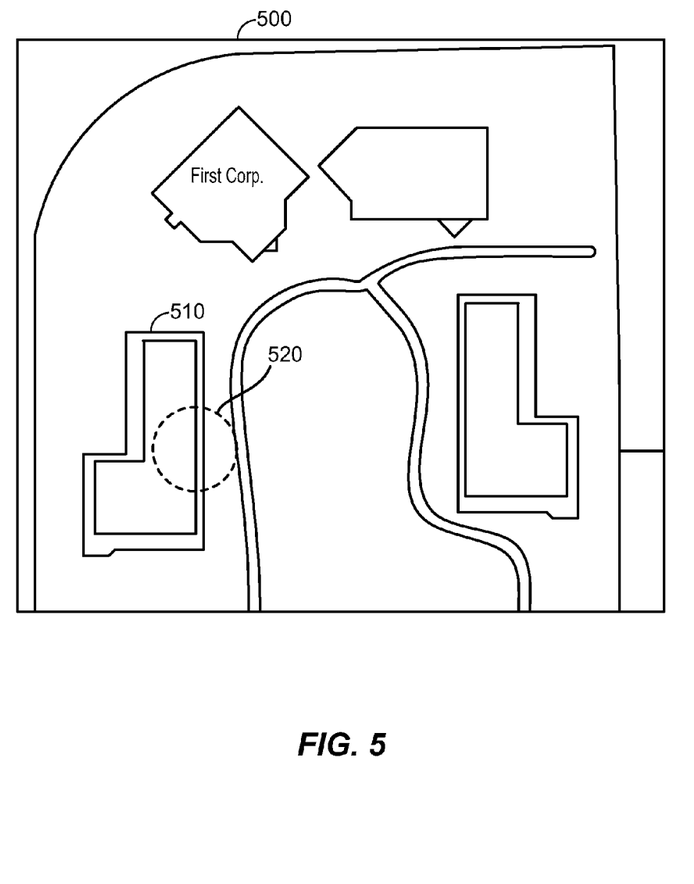
FIG. 5 illustrates a visual representation of an exemplary shape file that includes a number of buildings of a particular industrial complex.

FIG. 5 illustrates a visual representation of an exemplary shape file 500 that includes a number of buildings of a particular industrial complex. A shape-file can be, for example, a set of building outlines that belong to a single building or building complex, along with that building's metadata, such as the building name, its GPS coordinates, its street address, etc. FIG. 5 also illustrates an exemplary uncertainty ellipse 520 indicating the possible location of a particular UE. As illustrated, there is more than a 50% likelihood that the UE is within the building 510. Based on the uncertainty ellipse 520, the frequency with which the UE has previously visited the building 510, and/or the popularity of other UEs within the building 510, the UE may determine whether or not it is likely within the building 510.

If the UE is estimated to be indoors, the UE can perform one or more of three operations: (1) it can prefetch LCI-D assistance data in anticipation of an indoor positioning API request; (2) it can perform LCI-D in the background; and/or (3) it can optionally prefetch the positioning assistance data for the LCI-D.

At this point, a UE may typically continue to try to obtain outdoor positioning system position fixes indoors even though it cannot typically receive satellite signals and/or the uncertainty ellipse is large. Instead, however, if the UE is deemed to be inside one of the buildings in the shape file(s), the outdoor positioning system can be turned off and the position can be shown textually or visually as a highlighted building name or building boundary on the UE instead of a single dot. Further, if an indoor positioning system is available, the UE can turn on the corresponding receiver at this point, while still highlighting the venue as the contextual position of the user.

Figure 6:
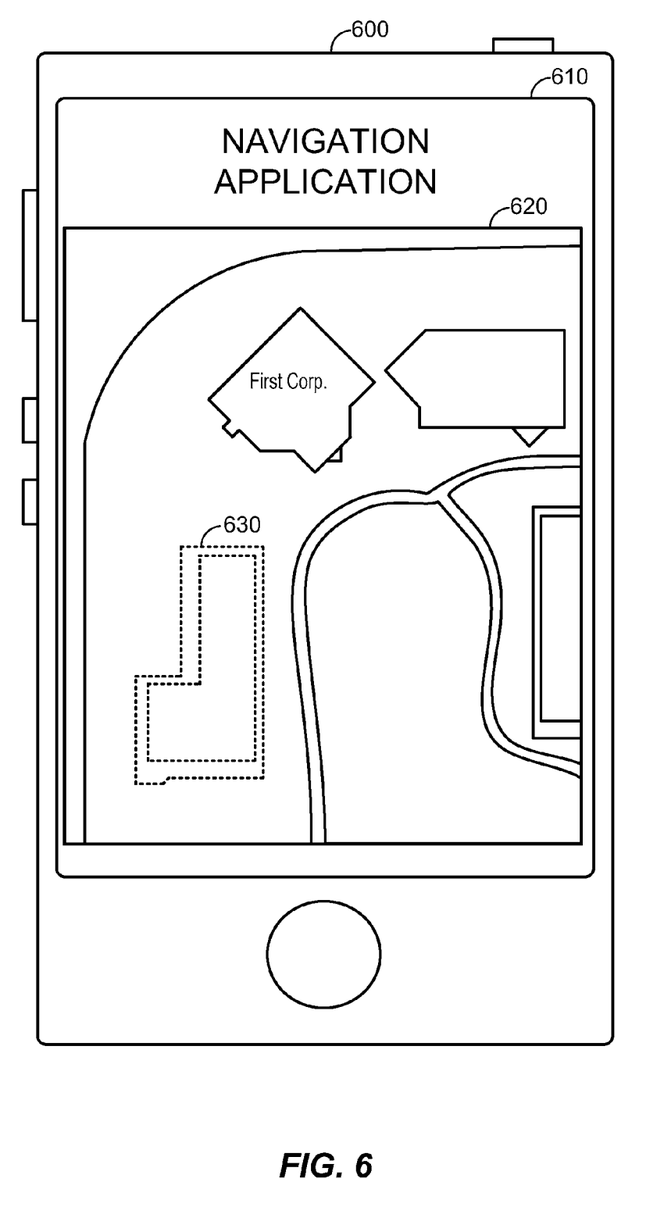
FIG. 6 illustrates an exemplary UE displaying a map/visual representation of a shape file on a user interface.

FIG. 6 illustrates an exemplary UE 600 displaying a map/visual representation of a shape file 620 on a user interface 610. The UE 600 has determined that it is located inside building 630. Accordingly, UE 600 highlights building 630. In the example of FIG. 6, the UE 600 has highlighted the boundary of building 630.

Figure 7A:
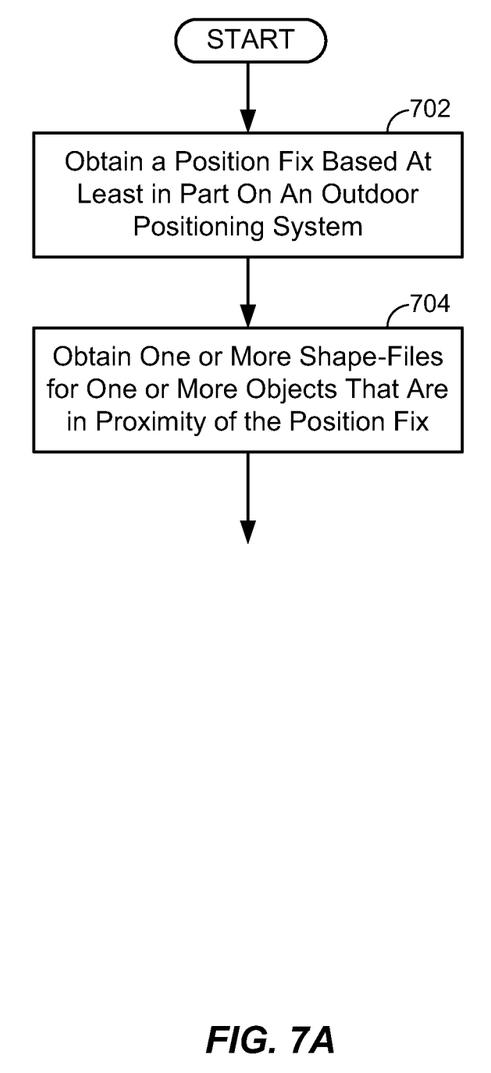
FIG. 7A illustrates an exemplary flow for determining whether or not a UE is indoors.

FIG. 7A illustrates an exemplary flow for determining whether or not a UE is indoors. At 702, the UE obtains a position fix based, at least in part, on an outdoor positioning system. The outdoor positioning system may be one of a GNSS, a GPS, a WWAN, or a hybrid system. The position fix is provided as a latitude and longitude.

At 704, the UE obtains one or more shape-files for one or more objects that are in proximity of the position fix. A single shape file may contain one or more objects. The UE can download the shape-file(s) from a server having predetermined shape-files. The one or more objects may include one or more indoor locations, one or more indoor positioning-enabled outdoor locations, and/or objects where outdoor positioning systems are not available. Such objects may include, but are not limited to, buildings, subway systems, cruise ships, outdoor athletic arenas/sports stadiums, and/or the like.

Figure 7B:
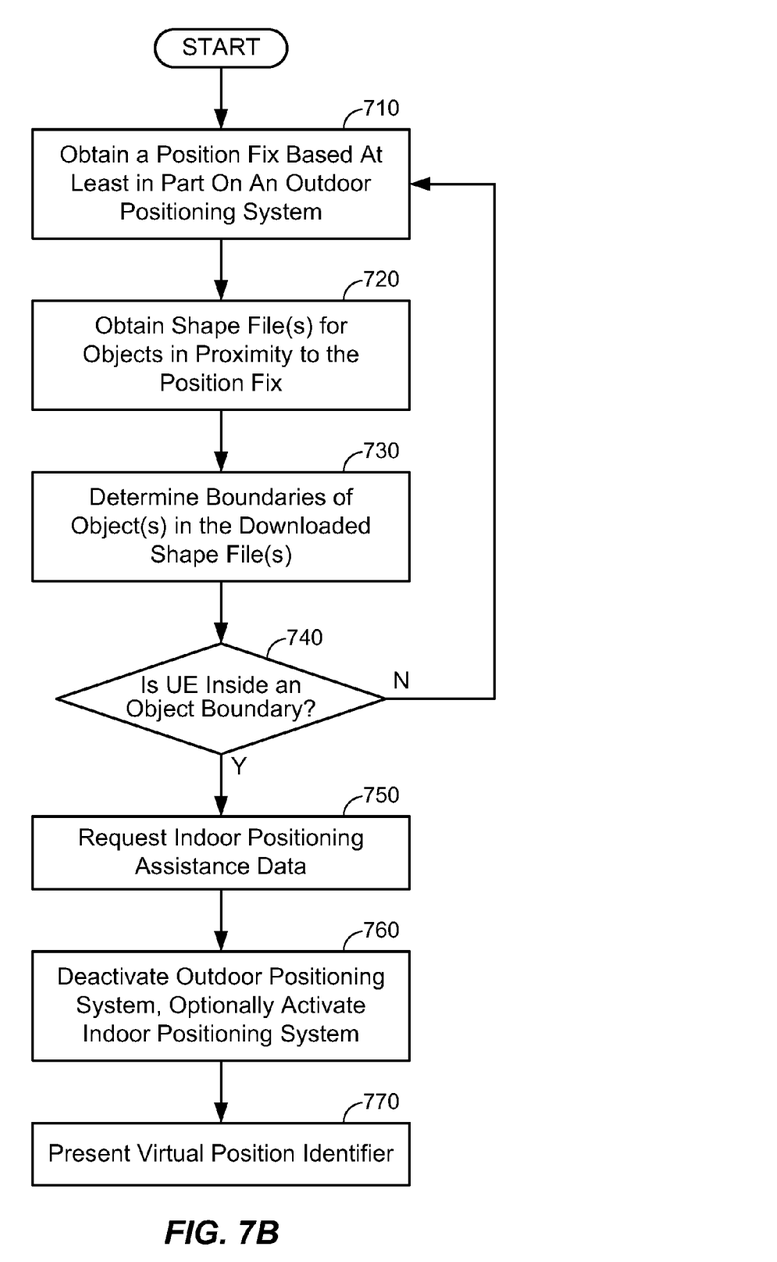
FIG. 7B illustrates an exemplary flow for determining whether or not a UE is indoors.

FIG. 7B illustrates an exemplary flow for determining whether or not a UE is indoors. At 710, the UE obtains a position fix based, at least in part, on an outdoor positioning system. The outdoor positioning system may be one of a GNSS, a GPS, a WWAN, or a hybrid system. The position fix is provided as a latitude and longitude.

At 720, the UE obtains one or more shape-files for one or more objects that are in proximity of the position fix. A single shape file may contain one or more objects. The UE can download the shape-file(s) from a server having predetermined shape-files. The one or more objects may include one or more indoor locations, one or more indoor positioning-enabled outdoor locations, and/or objects where outdoor positioning systems are not available. Such objects may include, but are not limited to, buildings, subway systems, cruise ships, outdoor athletic arenas/sports stadiums, and/or the like.

At 730, the UE determines the boundaries of the one or more objects in the downloaded shape-files. The UE may determine the boundaries of the one or more objects by performing computer vision-based analysis of the shape file(s) to detect the boundaries of the one or more objects. Alternatively, the boundaries may already be specified in the downloaded shape file(s).

At 740, the UE determines whether or not it is inside an object boundary. The UE can determine whether or not it is inside an object boundary by determining that an uncertainty ellipse representing an uncertainty of a position of the UE overlaps an object boundary. The UE can determine that the uncertainty ellipse overlaps the object boundary by any amount, for example, by 1% or more, or that it substantially overlaps the object boundary. The uncertainty ellipse may "substantially" overlap the object boundary if, for example, 75% or more of the ellipse overlaps the object boundary. The UE can also use a popularity metric of other UEs that are deemed to be "in" the object to determine whether or not it is inside the object boundary. This popularity metric can be obtained via crowdsourcing, as described above. The UE can also determine whether or not it is inside a given object based on a frequency with which it determines that it is within the object. This metric can be obtained by selfsourcing indoor positioning system fixes, as described above. If the UE is not inside an object boundary, then the flow returns to 710.

If, however, the UE determines that it is inside an object boundary, then at 750, the UE can request indoor positioning assistance data. For example, the UE can prefetch LCI-D assistance data in anticipation of an indoor positioning API request, it can perform LCI-D in the background, and/or (3) it can optionally prefetch the positioning assistance data for the LCI-D.

At 760, the UE can deactivate the outdoor positioning system to save power, since the outdoor positioning system will not be able to provide an accurate location while the UE is inside the object. Alternatively, if the object is an indoor positioning-enabled outdoor location, the UE may deactivate the outdoor positioning system and switch to the indoor positioning system if the indoor positioning system will provide greater positioning accuracy and/or greater power savings. The UE can then optionally activate an indoor positioning system to track its location within the object.

At 770, the UE can present to the user, on its user interface (UI), a virtual position identifier based on the given object. The position identifier can be shown textually or visually as a highlighted object name or object boundary on the UI instead of a single dot.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for determining whether or not a mobile device is indoors, comprising:
   obtaining, by the mobile device, a position fix based, at least in part, on an outdoor positioning system;
   obtaining, by the mobile device, one or more shape-files for one or more objects that are in proximity of the position fix, wherein obtaining the one or more shape-files comprises downloading, by the mobile device, one or more shape-files of outlines of buildings, where the outlines downloaded by the mobile device are biased based on at least one metric selected from the group consisting of: a popularity of other mobile devices inside a building, an amount of time that the mobile device has previously spent inside a building, and a frequency with which the mobile device has previously been inside a building; and
   determining that the mobile device is inside a given object boundary based on at least the one or more shape-files.

2. The method of claim 1, further comprising:
   requesting indoor positioning assistance data.

3. The method of claim 2, wherein determining that the mobile device is inside further comprises:
   determining that an uncertainty ellipse representing an uncertainty of a position of the mobile device overlaps the given object boundary.

4. The method of claim 3, wherein determining that the mobile device is inside further comprises:
   determining that an uncertainty ellipse representing an uncertainty of a position of the mobile device substantially overlaps the given object boundary.

5. The method of claim 4, wherein the uncertainty ellipse substantially overlaps the given object boundary if 75% or more of the uncertainty ellipse overlaps the given object boundary.

6. The method of claim 1, further comprising:
   deactivating the outdoor positioning system.

7. The method of claim 1, further comprising:
   providing a virtual position identifier based on the given object boundary.

8. The method of claim 7, wherein providing the virtual position identifier comprises highlighting a representation of the given object boundary on a user interface of the mobile device.

9. The method of claim 1, further comprising:
   activating an indoor positioning system.

10. The method of claim 1, wherein the position fix is provided as a latitude and longitude.

11. The method of claim 1, wherein the outdoor positioning system is one of a global navigation satellite system (GNSS), a global positioning system (GPS), or a hybrid system.

12. The method of claim 1, wherein obtaining the one or more shape-files comprises:
    downloading the one or more shape-files from a server having predetermined shape-files; and
    determining boundaries of the one or more objects from the one or more shape-files.

13. The method of claim 12, wherein determining the boundaries of the one or more objects comprises:
    performing analysis of the shape files to detect the boundaries of the one or more objects.

14. The method of claim 1, wherein the one or more objects comprise one or more indoor locations and/or one or more indoor positioning-enabled outdoor locations.

15. The method of claim 1, wherein the one or more objects comprise objects where outdoor positioning systems are not available.

16. An apparatus for determining whether or not a mobile device is indoors, comprising:
    logic configured to obtain, by the mobile device, a position fix based, at least in part, on an outdoor positioning system;
    logic configured to obtain, by the mobile device, one or more shape-files for one or more objects that are in proximity of the position fix, wherein the logic configured to obtain one or more shape-files comprises logic configured to download, by the mobile device, one or more shape-files of outlines of buildings, where the outlines downloaded by the mobile device are biased based on at least one metric selected from the group consisting of: a popularity of other mobile devices inside a building, an amount of time that the mobile device has previously spent inside a building, and a frequency with which the mobile device has previously been inside a building; and; and
    logic configured to determine that the mobile device is inside a given object boundary based on at least the one or more shape-files.

17. The apparatus of claim 16, further comprising:
    logic configured to request indoor positioning assistance data.

18. The apparatus of claim 17, wherein the logic configured to determine that the mobile device is inside further comprises:
    logic configured to determine that an uncertainty ellipse representing an uncertainty of a position of the mobile device overlaps the given object boundary.

19. The apparatus of claim 18, wherein the logic configured to determine that the mobile device is inside further comprises:
    logic configured to determine that an uncertainty ellipse representing an uncertainty of a position of the mobile device substantially overlaps the given object boundary.

20. The apparatus of claim 19, wherein the uncertainty ellipse substantially overlaps the given object boundary if 75% or more of the uncertainty ellipse overlaps the given object boundary.

21. The apparatus of claim 16, further comprising:
logic configured to deactivate the outdoor positioning system.

22. The apparatus of claim 16, further comprising:
logic configured to provide a virtual position identifier based on the given object boundary.

23. The apparatus of claim 22, wherein the logic configured to provide the virtual position identifier comprises logic configured to highlight a representation of the given object boundary on a user interface of the mobile device.

24. The apparatus of claim 16, further comprising:
logic configured to activate an indoor positioning system.

25. The apparatus of claim 16, wherein the position fix is provided as a latitude and longitude.

26. The apparatus of claim 16, wherein the outdoor positioning system is one of a global navigation satellite system (GNSS), a global positioning system (GPS), or a hybrid system.

27. The apparatus of claim 16, wherein the logic configured to obtain the one or more shape-files comprises:
logic configured to download the one or more shape-files from a server having predetermined shape-files; and
logic configured to determine boundaries of the one or more objects from the one or more shape-files.

28. The apparatus of claim 27, wherein the logic configured to determine the boundaries of the one or more objects comprises:
logic configured to perform analysis of the shape files to detect the boundaries of the one or more objects.

29. The apparatus of claim 16, wherein the one or more objects comprise one or more indoor locations and/or one or more indoor positioning-enabled outdoor locations.

30. The apparatus of claim 16, wherein the one or more objects comprise objects where outdoor positioning systems are not available.

31. An apparatus for determining whether or not a mobile device is indoors, comprising:
means for obtaining, by the mobile device, a position fix based, at least in part, on an outdoor positioning system;
means for obtaining, by the mobile device, one or more shape-files for one or more objects that are in proximity of the position fix, wherein the means for obtaining the one or more shape-files comprises means for downloading, by the mobile device, one or more shape-files of outlines of buildings, where the outlines downloaded by the mobile device are biased based on at least one metric selected from the group consisting of: a popularity of other mobile devices inside a building, an amount of time that the mobile device has previously spent inside a building, and a frequency with which the mobile device has previously been inside a building; and
means for determining that the mobile device is inside a given object boundary based on at least the one or more shape-files.

32. The apparatus of claim 31, further comprising:
means for providing a virtual position identifier based on the given object boundary.

33. The apparatus of claim 31, wherein the means for obtaining the one or more shape-files comprises:
means for downloading the one or more shape-files from a server having predetermined shape-files; and
means for determining boundaries of the one or more objects from the one or more shape-files.

34. A non-transitory computer-readable medium for determining whether or not a mobile device is indoors, comprising:
at least one instruction to obtain, by the mobile device, a position fix based, at least in part, on an outdoor positioning system;
at least one instruction to obtain, by the mobile device, one or more shape-files for one or more objects that are in proximity of the position fix, wherein the at least one instruction to obtain the one or more shape-files comprises at least one instruction to download, by the mobile device, one or more shape-files of outlines of buildings, where the outlines downloaded by the mobile device are biased based on at least one metric selected from the group consisting of: a popularity of other mobile devices inside a building, an amount of time that the mobile device has previously spent inside a building, and a frequency with which the mobile device has previously been inside a building; and
at least one instruction to determine that the mobile device is inside a given object boundary based on at least the one or more shape-files.

35. The non-transitory computer-readable medium of claim 34, further comprising:
at least one instruction to provide a virtual position identifier based on the given object boundary.

36. The non-transitory computer-readable medium of claim 34, wherein the at least one instruction to obtain the one or more shape-files comprises:
at least one instruction to download the one or more shape-files from a server having predetermined shape-files; and
at least one instruction to determine boundaries of the one or more objects from the one or more shape-files.

* * * * *